United States Patent [19]

Maruyama et al.

[11] Patent Number: 5,200,480
[45] Date of Patent: Apr. 6, 1993

[54] CHLOROTRIFLUOROETHYLENE BASED COPOLYMER SUITABLE AS PAINT VEHICLE

[75] Inventors: Yutaka Maruyama; Hidenari Okinaka; Kengo Kadotani, all of Kamifukuoka, Japan

[73] Assignee: Central Glass Company Limited, Ube City, Japan

[21] Appl. No.: 718,562

[22] Filed: Jun. 20, 1991

[30] Foreign Application Priority Data

Jun. 20, 1990 [JP] Japan .................. 2-161551

[51] Int. Cl.$^5$ ............................................. C08F 214/18
[52] U.S. Cl. .................... 526/249; 526/332; 526/333
[58] Field of Search ............ 526/249, 332, 333

[56] References Cited

U.S. PATENT DOCUMENTS

| | | |
|---|---|---|
| 4,631,326 | 12/1986 | Koishi et al. |
| 4,640,966 | 2/1987 | Mitani et al. .................. 526/249 |
| 4,788,266 | 11/1988 | Koishi et al. .................. 526/249 |
| 4,985,519 | 1/1991 | Koishi et al. .................. 526/249 |
| 5,043,390 | 8/1991 | Koishi et al. .................. 526/249 |

FOREIGN PATENT DOCUMENTS

| | | | |
|---|---|---|---|
| 2163756 | 3/1986 | United Kingdom | 526/249 |
| 2189794 | 11/1987 | United Kingdom | 526/249 |
| 2223500 | 4/1990 | United Kingdom | 526/249 |

*Primary Examiner*—Joseph L. Schofer
*Assistant Examiner*—N. Sarafin
*Attorney, Agent, or Firm*—Keck, Mahin & Cate

[57] ABSTRACT

The invention provides a copolymer of 25-75 mol % of chlorotrifluoroethylene, 10-70 mol % of a vinyl or isopropenyl ester of fatty acid and 3-75 mol % of a hydroxyl-containing allyl ether represented by $CH_2=CH-CH_2-O-(CH-)_n-OH$, where n is an integer from 3 to 8, and 0-40 mol % of optional monomer(s) such as, e.g., vinylacetic acid or an acrylate. The copolymer is soluble in various organic solvents and curable with a polyisocyanate or a melamine resin, and the cured copolymer is excellent in weatherability, water resistance, chemical resistance and abrasion resistance. The copolymer is suitable for use as a paint vehicle.

10 Claims, No Drawings

CHLOROTRIFLUOROETHYLENE BASED COPOLYMER SUITABLE AS PAINT VEHICLE

BACKGROUND OF THE INVENTION

This invention relates to a chlorotrifluoroethylene based copolymer which is soluble in various organic solvents, curable at relatively low temperatures and suitable for use as a paint vehicle.

Fluororesins are generally excellent in chemical resistance, weather resistance and heat resistance. Accordingly paints using a fluororesin as the vehicle have been developed for application to, for example, chemical plants, buildings and other constructions, machinery and food containers. Recently much attention has been directed to solvent-thinned paints using a fluororesin which is soluble in organic solvents and curable at relatively low temperatures. Fluororesin paints of this type are comparable to paints using other conventional resins in the ease of application and provide paint films superior in chemical resistance and weather resistance.

To render a fluororesin soluble in practical organic solvents, usually it is necessary to reduce crystallinity of the fluororesin by copolymerization thereby to accomplish internal plasticization. There are some other problems to be resolved for using a soluble fluororesin as a paint vehicle. The problems include how to retain a desirable degree of rigidity or shear modulus in the modified fluororesin, how to control the molecular weight of the fluororesin with a view to desirably adjusting the viscosities of paints and how to select and control the kind and amount of a functional group to be introduced into the fluororesin in order to render the resin curable. The cost of manufacture also has to be taken into consideration. It is not easy to reach a balanced solution for all the problems.

U.S. Pat. No. 4,631,326 discloses a copolymer of, essentially, chlorotrifluoroethylene (CTFE), a fatty acid vinyl or isopropenyl ester and a hydroxyl-containing allyl ether such as ethylene glycol monoally ether. This copolymer is soluble in various organic solvents and curable with a polyisocyanate or a melamine resin, and the cured copolymer is hardly soluble in organic solvents in which the uncured copolymer is soluble. Therefore, a solution of the copolymer is useful as a liquid vehicle of a paint.

The CTFE based copolymer of U.S. Pat. No. 4,631,326 provides paint or coating films which are fairly good in physical and chemical properties. However, in our view it is desirable to further improve that copolymer in respect of water resistance, acid resistance and abrasion resistance without sacrificing other properties including good solubilities in various organic solvents and curability at relatively low temperatures.

SUMMARY OF THE INVENTION

It is an object of the present invention to provide a CTFE based copolymer which is soluble in organic solvents, curable even at normal temperature and, hence, suitable for use as a paint vehicle and which is superior to the copolymer of the aforementioned patent particularly in respect of the chemical resistance, water resistance and abrasion resistance of films formed from solutions.

According to the invention there is provided a copolymer comprising 25 to 75 mol % of first repeating units which originate from chlorotrifluoroethylene, 10 to 70 mol % of second repeating units which originate from a fatty acid ester represented by the formula (1),

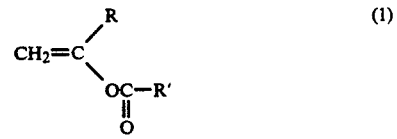

wherein R is hydrogen atom or methyl group, and R' is an alkyl group having 1 to 12 carbon atoms, and 3 to 75 mol % of third repeating units which originate from a hydroxyl-containing allyl ether represented by the formula (2),

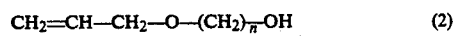

wherein n is an integer from 3 to 8.

The gist of the present invention is to modify the CTFE based copolymer of U.S. Pat. No. 4,631,326 by using a hydroxyl-containing allyl ether of a specific type to introduce hydroxyl group (functional group) into the copolymer.

The patent specifies to use a hydroxyl-containing allyl ether represented by the formula (2A),

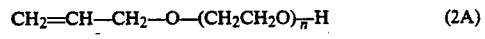

wherein n is an integer from 1 to 6.

When n in the formula (2A) takes a relatively large value the allyl ether has a number of ether bonds ($-O-$) in the manner of $-CH_2-CH_2-O-CH_2-CH_2-O-$: that is, the allyl ether has the fundamental structure of polyethylene glycol. Even when the molecular weight is relatively high polyethylene glycol is a water soluble polymer. Thus, an allyl ether of the formula (2A) is inherently hydrophilic. Besides, the ether bond in the structure of the formula (2A) is susceptible to hydrolysis by the action of an acid. Therefore, in preparing a fluoroolefin based copolymer having hydroxyl group as a functional group the use of an allyl ether of this type may be unfavorable for the water resistance and acid resistance of the copolymer.

In contrast, an increase in the value of n in the formula (2) means an extension of methylene chain, $-CH_2-CH_2-CH_2-$, viz. the fundamental structure of polyethylene. Polyethylene is very repellent to water and oil and excellent in resistance to acids, alkalis and various solvens. That is, an allyl ether of the formula (2) is inherently hydrophobic.

By using a hydroxyl-containing allyl ether of the formula (2) in place of a hydroxyl-cotaing allyl ether of the formula (2A), we have succeeded in obtaining a CTFE based copolymer which is soluble in various organic solvents and easily curable by an ordinary curing agent such as a polyisocyanate and is considerably improved in water resistance and acid resistance and also in abrasion resistance of films formed from solutions of the copolymer. This copolymer in cured form is high in transparency and excellent in weather resistance, chemical resistance and abrasion or scratch resistance. A solution of this copolymer and a curing agent is useful as a coating liquid composition, and a paint composition is obtained by dispersing a pigment in the solution.

DESCRIPTION OF THE PREFERRED EMBODIMENTS

For a copolymer according to the invention, CTFE is exclusively used as the basic, fluorine-containing component. CTFE must occupy 25-75 mol % of the copolymer. If the amount of CTFE is too small the copolymer becomes insufficient in chemical resistance and weather resistance. If the amount of CTFE is too large the copolymer becomes low in solubilities in organic solvents, and it becomes difficult to prepare the copolymer at good yield. It is preferable that CTFE occupies 40-60 mol % of the copolymer.

The second component of the copolymer is selected from a group of fatty acid vinyl esters and fatty acid isopropenyl esters both of which are represented by the formula (1).

Examples of useful fatty acid vinyl esters are vinyl acetate, vinyl propionate, vinyl butyrate, vinyl isobutyrate, vinyl pivalate, vinyl caproate, vinyl isocaproate, vinyl caprylate, vinyl caprate, and VEOVA-9 and VEOVA-10 which are tradenames of Showa-Shell Chem. CO. for vinyl esters of synthetic monocarboxylic acids having 9 and 10 carbon atoms, respectively. Both VEOVA-9 and VEOVA-10 have a branched structure represented by the formula (3):

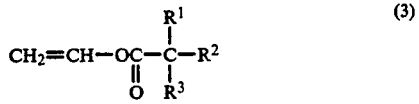

$$CH_2=CH-OC-\underset{\underset{R^3}{|}}{\overset{\overset{R^1}{|}}{C}}-R^2 \quad (3)$$
$$\phantom{CH_2=CH-O}\|$$
$$\phantom{CH_2=CH-O}O$$

wherein $R^1$, $R^2$ and $R^3$ are alkyl groups at least one of which is methyl group, the total number of carbon atoms in the alkyl groups $R^1$, $R^2$ and $R^3$ is 7 or 8.

If desired it is possible to use a combination of two or more kinds of fatty acid vinyl esters.

In the case of using a fatty acid isopropenyl ester it is suitable to choose isopropenyl acetate or isopropenyl propionate, and the former is preferred because of ease of preparing a desired copolymer.

In the copolymer the vinyl or propenyl ester component needs to amount to 10-70 mol %. If the amount of this component is too small the copolymer will become too low in molecular weight, and some difficulties will arise in preparing the copolymer. If the amount of this component is too large the copolymer becomes insufficient in chemical resistance and weather resistance. It is preferable that the vinyl or isopropenyl ester component amounts to 20-50 mol % of the copolymer.

The third component is a hydroxyl-containing allyl ether represented by the formula (2). In the formula (2) the value of n, viz. length of the methylene chain adjacent to hydroxyl group, is limited within the range from 3 to 8. The length of the methylene chain affects the degree of curability of the copolymer and the properties of the films formed by curing the copolymer. When the value of n is smaller than 3 the rate of curing reaction of the copolymer with an ordinary curing agent is relatively low, and the cured copolymer may be inferior in physical properties and chemical resistance. When the value of n is larger than 8 the cured copolymer is too soft and insufficient in resistance to solvents. Suitable hydroxyl-containing allyl ethers are 3-allyloxy-1-propanol, 4-allyloxy-1-butanol, 5-allyloxy-1-pentanol, 6-allyloxy-1-hexanol, 7-allyloxy-1-heptanol and 8-allyloxy-1-octanol.

In the copolymer the hydroxyl-containing allyl ether component needs to amount to 3-75 mol %. If the amount of this component is too small the copolymer does not readily undergo curing reaction so that the cured copolymer is insufficient in chemical resistance and weather resistance, and a coating or paint composition using the copolymer becomes poor in recoatability. If the amount of this component is too large the copolymer will become too low in molecular weight, and some difficulties arise in preparing the copolymer. It is preferred that the allyl ether component amounts to 5-50 mol % of the copolymer.

When it is intended to use a copolymer according to the invention in a coating liquid composition or a paint composition, it is important to adjust the composition of the copolymer such that the intrinsic viscosity of the copolymer dissolved in tetrahydrofuran at 30° C. falls in the range from 0.05 to 2.0 dl/g, and preferably in the range from 0.1 to 0.5 dl/g. If the intrinsic viscosity is too high the solubilities of the copolymer in organic solvents are not desirably high. If the intrinsic viscosity is too low the coating liquid or paint composition will be unsatisfactory in applicability and will fail to provide films having desirably good properties.

Besides the above described essential components, another monomer or some other monomers may optionally be incorporated in a copolymer according to the invention on condition that the optional comonomer(s) does not occupy more than 40 mol % of the copolymer. For example, vinylacetic acid may be incorporated in the copolymer mainly for the purpose of improving dispersibilities of pigments in a solution of the copolymer. Other examples of optional comonomers are acrylates and methacrylates such as ethyl acrylate, methyl methacrylate and glycidyl methacrylate, acrylic amides such as acrylamide and N-methylol acrylamide and vinyl ethers such as ethylvinyl ether, butylvinyl ether and hydroxybutylvinyl ether. It is preferable that in the copolymer the total amount of the optional component(s) is not more than 30 mol %.

As to the purities of monomers for use in this invention, gas chromatography purity of 98% or above is sufficient so long as impurities obstructive to usual radical polymerization reactions are not contained.

A copolymer according to the invention is obtained by copolymerizing the essential three kinds of monomers, and optional monomer(s) if used, in the presence of a commonly used radical polymerization initiator. The manner of the copolymerization reaction is not particularly limited. The object is accomplished by solution polymerization, emulsion polymerization, suspension polymerization or bulk polymerization.

The copolymerization reaction can be carried out at temperatures ranging from about −30° C. to about 100° C. In most cases a suitable range of the reaction temperature is from 0° to 70° C. A suitable radical polymerization initiator can be selected from oil-soluble initiators including organic peroxides such as di-isopropyl peroxydicarbonate, di-n-propyl peroxydicarbonate, t-butyl peroxypivalate, di-2-ethylhexyl peroxydicarbonate, benzoyl peroxide, lauroyl peroxide and perfluorooctanoyl peroxide, azo compounds such as azobisisobutyronitrile and azobis-2,4-dimethylvaleronitrile and organic boron compounds such as oxytriethylboron and peroxytriethylboron, and water-soluble initiators such as hydrogen peroxide, potassium persulfate, ammonium persulfate and redox type initiators.

As to a liquid medium for the copolymerization reaction, a suitable selection is made from water, hydrocarbons and organic fluorine-containing compounds depending on the particulars of the reaction. If desired a mixture of two or three kinds of solvents may be used. In the case of copolymerization reaction in an aqueous medium it is usual to use a conventional emulsifying agent or a suspension stabilizing agent.

Copolymers of the invention are soluble in cyclic ethers such as tetrahydrofuran and dioxane, aromatic solvents such as benzene, toluene and xylene, esters such as ethyl acetate and butyl acetate, ketones such as acetone and methylethyl ketone, nitrogen-containing solvents such as dimethylformamide and dimethylacetamide and halogen-containing solvents such as 1,1,1-trichloroethane and trichloroethylene. In every case a clear and transparent solution is obtained.

A copolymer of the invention has hydroxyl group in the molecular chain and, hence, can be cured by reaction with a compound that reacts with hydroxyl group. For example, a polyisocyanate or a melamine resin can be used as the curing agent. In the case of using a polyisocyanate, it is possible to cure the copolymer even at normal temperature. In the case of using a melamine resin, adequate heating is necessary for curing the copolymer. A paint composition is obtained by dissolving a copolymer of the invention and a curing agent in an organic solvent and dispersing a pigment in the solution. The pigment exhibits good dispersibility in the solution. By usual coating and curing operations the paint composition gives a paint film which is high in transparency, sufficiently hard and high in resistance to abrasion and scratches and excellent in durability. Besides a pigment, optional additives such as, for example, an ultraviolet absorbing agent and a dispersion stabilizing agent may be added to the solution. Such optional additives too exhibit good dispersibility in the solution.

The following examples are illustrative of the invention, but these examples are not limitative.

EXAMPLE 1

A 2-liter stainless steel autoclave provided with an electromagnetic stirrer was charged with 159.2 g of vinyl acetate (VAc), 102.0 g of 3-allyloxy-1-propanol (HPAE), 340 g of xylene, 1.1 g of calcium carbonate and 0.5 g of lauroyl peroxide. The gas atmosphere in the autoclave was replaced by nitrogen gas, and this operation was repeated twice. After that nitrogen gas was purged from the autoclave, and 360.6 g of CTFE was introduced into the autoclave. The proportions of the charged monomers were 52 mol % of CTFE, 32 mol % of VAc and 16 mol % of HPAE. The temperature in the autoclave was gradually raised up to 60° C., and at this temperature polymerization reaciton was carried out for 24 hr. After the reaction unreacted CTFE was discharged from the autoclave, and the reaction liquid was taken out of the autoclave. The liquid was a solution of a CTFE/VAc/HPAE copolymer. After filtration, the solution was clear and colorless. The concentration of the copolymer in the solution was 57.0 wt %.

The above solution was poured into n-hexane to precipitate the copolymer, which weighed 410.9 g after drying. By analysis the obtained copolymer was composed of 48.1 mol % of CTFE, 36.8 mol % of VAc and 15.1 mol % of HPAE. The intrinsic viscosity ($\eta$) of this copolymer in tetrahydrofuran at 30° C. was 0.13 dl/g. Infrared absorption spectrum of the copolymer had absorption peaks at 3530 cm$^{-1}$ (—OH), 2890-3020 cm$^{-1}$ (C—H) and 1760 cm$^{-1}$ (C=O). By thermal analysis by differential scanning calorimetry (DSC) and thermogravimetry (TG) the copolymer did not exhibit a melting point. By TG a reduction in the weight of the copolymer began at a temperature above 250° C. The copolymer was subjected to analysis of chemical composition, molecular weight (number average molecular weight, $M_n$), OH value and acid value. The results are shown in Table 1.

In the following examples the copolymerization process of Example 1 was repeated with selective changes in the kind and quantity of monomers other than CTFE. The quantities of xylene and calcium carbonate were slightly varied. In every example a colorless and clear solution of a copolymer was obtained, and in the obtained solution the concentration of the copolymer was 52-57 wt %. The obtained copolymers were analyzed by the same methods. The results are shown in Table 1.

EXAMPLE 2

In place of VAc, 211.0 g of vinyl butyrate (VBu) was used, and in place of HPAE, 114.3 g of 4-allyloxy-1-butanol (HBAE) was used.

EXAMPLE 3

In place of VAc, 366.6 g of VEOVA-10 (V-10) was used, and in place of HPAE, 114.3 g of HBAE was used.

EXAMPLE 4

In place of VAc, 210.0 g of VBu was used, and in place of HPAE, 114.3 g of HBAE was used. In addition, 5.1 g of vinylacetic acid (VAA) was charged in the autoclave.

EXAMPLE 5

In place of VAc, 435.0 g of V-10 was used, and in place of HPAE, 123.6 g of HBAE was used. In addition, 6.8 g of VAA was used.

EXAMPLE 6

In place of VAc, 366.6 g of V-10 was used, and in place of HPAE, 126.6 g of 5-allyloxy-1-pentanol (HPeAE) was used. In addition, 6.0 g of VAA was used.

EXAMPLE 7

In place of VAc, 366.6 g of V-10 was used, and in place of HPAE, 138.9 g of 6-allyloxy-1-hexanol (HHeAE) was used. In addition, 5.5 g of VAA was used.

COMPARATIVE EXAMPLE 1

The copolymerization process of Example 1 was modified only in that 116.2 g of ethylene glycol monoallyl ether, viz. 2-allyloxy-1-ethanol (HEAE) was used in place of HPAE and that the quantity of xylene was increased to 370 g. In the obtained solution the concentration of the copolymer was 56 wt %.

COMPARATIVE EXAMPLE 2

Comparative Example 1 was modified only in that 211.1 g of VBu was used in place of VAc and that 5.1 g of VAA was additionally used. The quantity of xylene was 420 g, and the quantity of calcium carbonate was 1.1 g. In the obtained solution the concentration of the copolymer was 55 wt %.

TABLE 1

|  | Ex. 1 | Ex. 2 | Ex. 3 | Ex. 4 | Ex. 5 | Ex. 6 | Ex. 7 | Comp. Ex. 1 | Comp. Ex. 2 |
|---|---|---|---|---|---|---|---|---|---|
| Composition of Copolymer (mol %) | | | | | | | | | |
| CTFE | 48.1 | 48.0 | 50.7 | 46.7 | 47.5 | 49.3 | 50.0 | 34.0 | 50.4 |
| VAc | 36.8 | | | | | | | 56.7 | |
| VBu | | 36.5 | | 37.5 | | | | | 38.3 |
| V-10 | | | 30.5 | | 35.5 | 30.9 | 31.3 | | |
| HBAE | | 15.5 | 18.8 | 14.8 | 16.0 | | | | |
| HPAE | 15.1 | | | | | | | | |
| HPeAE | | | | | | 18.6 | | | |
| HHeAE | | | | | | | 17.7 | | |
| HEAE | | | | | | | | 9.3 | 10.2 |
| VAA | | | | 1.0 | 1.0 | 1.2 | 1.0 | | 1.1 |
| Content of Fluorine (wt %) | 28.9 | 25.7 | 22.1 | 23.4 | 19.0 | 21.8 | 20.0 | 31.9 | 25.3 |
| Molecular Weight, $M_n$ | 9000 | 8500 | 8800 | 11000 | 7300 | 6800 | 6000 | 5000 | 5400 |
| OH Value (mg KOH/g) | 90 | 83 | 80 | 82 | 101 | 85 | 89 | 81 | 70 |
| Acid Value (mg KOH/g) | | | | 6 | 6 | 7 | 7 | | 5.6 |
| Intrinsic Viscosity (dl/g) | 0.13 | 0.15 | 0.17 | 0.16 | 0.11 | 0.10 | 0.09 | 0.08 | 0.08 |

EVALUATION TESTS

Each of the copolymers prepared in the foregoing examples and comparative examples was dissolved in xylene to obtain a 50 wt % solution, and 25 parts by weight of a butyrated melamine resin (UVAN 20SE-60 of Mitsui Toatsu Chemicals Co.) was added to 100 parts by weight of the copolymer solution. After that the viscosity of each solution was adjusted by adding a suitable amount of a thinner. Then each solution was applied to an aluminum plate by spraying, and after drying the coating film was cured by heating at 140°-160° C. for 30 min. In every case a transparent film was formed with good adhesion to the aluminum surface.

The cured coating films of Examples 1-7 and Comparative Examples 1 and 2 were subjected to measurement of the characteristics shown in Table 2.

The adhesion strength was tested by the cross-cut adhesion test according to JIS K 5400, and the result is indicated by the number of no peel areas among 100 areas tested with cellophane tape. The transmittance was measured on films having a thickness of 40 μm for wavelengths ranging from 360 to 800 nm. The hardness was tested by the pencil scratching test according to JIS K 5400, and the result is indicated by the maximum hardness of pencil that failed to give scratches.

Acid resistance was tested by immersing the samples in 60% sulfuric acid at 20° C. for 24 hr. Water resistance was tested by immersing the samples in boiling water for 3 hr. Humidity resistance was tested by keeping the samples in a hot and humid atmosphere at a temperature of 50° C. and at a relative humidity of 98% for 3000 hr. Gasoline resistance was tested by immersing the samples in gasoline at 60° C. for 1 hr. With respect to any of these tests, "A" in Table 2 means that no change in the surface state of the tested film was perceptible by observation with the naked eye, and "B" means that a slight change was perceptible.

Abrasion resistance was tested by applying a cleanser for household use to a flannel sheet and rubbing the cured film surface with that flannel sheet under load of 1.0 kg to make five reciprocating strokes. After that the film surface was observed with the naked eye. In Table 2, "A" means that abrasions or scratches were almost imperceptible, and "B" means that abrasions or scratches were perceptible and nearly conspicuous. Weatherability was tested by accelerated testing with a sunshine weathermeter for 4000 hr, and the surface gloss of each sample film was measured before and after the weathering test to indicate the degree of weatherability by percentage of the retained gloss.

TABLE 2

|  | Ex. 1 | Ex. 2 | Ex. 3 | Ex. 4 | Ex. 5 | Ex. 6 | Ex. 7 | Comp. Ex. 1 | Comp. Ex. 2 |
|---|---|---|---|---|---|---|---|---|---|
| Adhesion (no peel areas) | 100/100 | 100/100 | 100/100 | 100/100 | 100/100 | 100/100 | 100/100 | 100/100 | 100/100 |
| Transmittance (%) | >90 | >90 | >90 | >90 | >90 | >90 | >90 | >90 | >90 |
| Pencil Hardness | 2H | H | H | H | H | H | H | 2H | 2B |
| Acid Resistance | A | A | A | A | A | A | A | B | B |
| Water Resistance | A | A | A | A | A | A | A | B | B |
| Humidity Resistance | A | A | A | A | A | A | A | A | A |
| Gasoline Resistance | A | A | A | A | A | A | A | A | B |
| Abrasion Resistance | A | A | A | A | A | A | A | B | B |
| Weatherability (gloss (%) retained after accelerated test) | 89 | 93 | 91 | 90 | 92 | 93 | 92 | 88 | 90 |

What is claimed is:

1. A copolymer comprising:
   25 to 75 mol % of first repeating units which originate from chlorotrifluoroethylene;

10 to 70 mol % of second repeating units which originate from a fatty acid ester represented by the formula (1), $$CH_2=C\begin{matrix}R\\OC-R'\\\|\\O\end{matrix} \quad (1)$$

wherein R is hydrogen atom or methyl group, and R' is an alkyl group having 1 to 12 carbon atoms; and 3 to 75 mol % of third repeating units which originate from a hydroxyl-containing allyl ether represented by the formula (2), $$CH_2=CH-CH_2-O-(CH_2)_n-OH \quad (2)$$

wherein n is an integer from 3 to 8.

2. A copolymer according to claim 1, wherein said first, second and third repeating units amount to 40–60 mol %, 20–50 mol % and 5–50 mol %, respectively.

3. A copolymer according to claim 1, further comprising up to 40 mol % of auxiliary repeating units which originate from at least one monomer selected from the group consisting of vinylacetic acid, acrylates, methacrylates, acrylic amides and vinyl ethers.

4. A copolymer according to claim 3, wherein the amount of said auxiliary repeating units is not more than 30 mol %.

5. A copolymer according to claim 1, wherein the intrinsic viscosity of the copolymer dissolved in tetrahydrofuran is in the range from 0.05 to 2.0 dl/g at 30° C.

6. A copolymer according to claim 5, wherein said intrinsic viscosity is in the range from 0.1 to 0.5 dl/g.

7. A copolymer according to claim 1, wherein said fatty acid ester is a vinyl ester selected from the group consisting of vinyl acetate, vinyl propionate, vinyl butyrate, vinyl isobutyrate, vinyl pivalate, vinyl caproate, vinyl isocaproate, vinyl caprylate, vinyl caprate and vinyl esters represented by the formula (3), $$CH_2=CH-OC-\underset{R^3}{\overset{R^1}{\underset{|}{C}}}-R^2 \quad (3)$$
$$\phantom{CH_2=CH-O}\|\phantom{C-R^2}$$
$$\phantom{CH_2=CH-O}O$$

wherein $R^1$, $R^2$ and $R^3$ are alkyl groups at least one of which is methyl group, the total number of carbon atoms in the alkyl groups $R^1$, $R^2$ and $R^3$ is 7 or 8.

8. A copolymer according to claim 1, wherein said fatty acid ester is an isopropenyl ester selected from the group consisting of isopropenyl acetate and isopropenyl propionate.

9. A copolymer according to claim 1, wherein said hydroxyl-containing ally ether is 3-allyloxy-1-propanol.

10. A copolymer according to claim 1, wherein said hydroxyl-containing allyl ether is 4-allyloxy-1-butanol.

* * * * *